Dec. 22, 1953   J. N. McMILLAN   2,663,473
BOAT LOADING DEVICE
Filed July 3, 1951
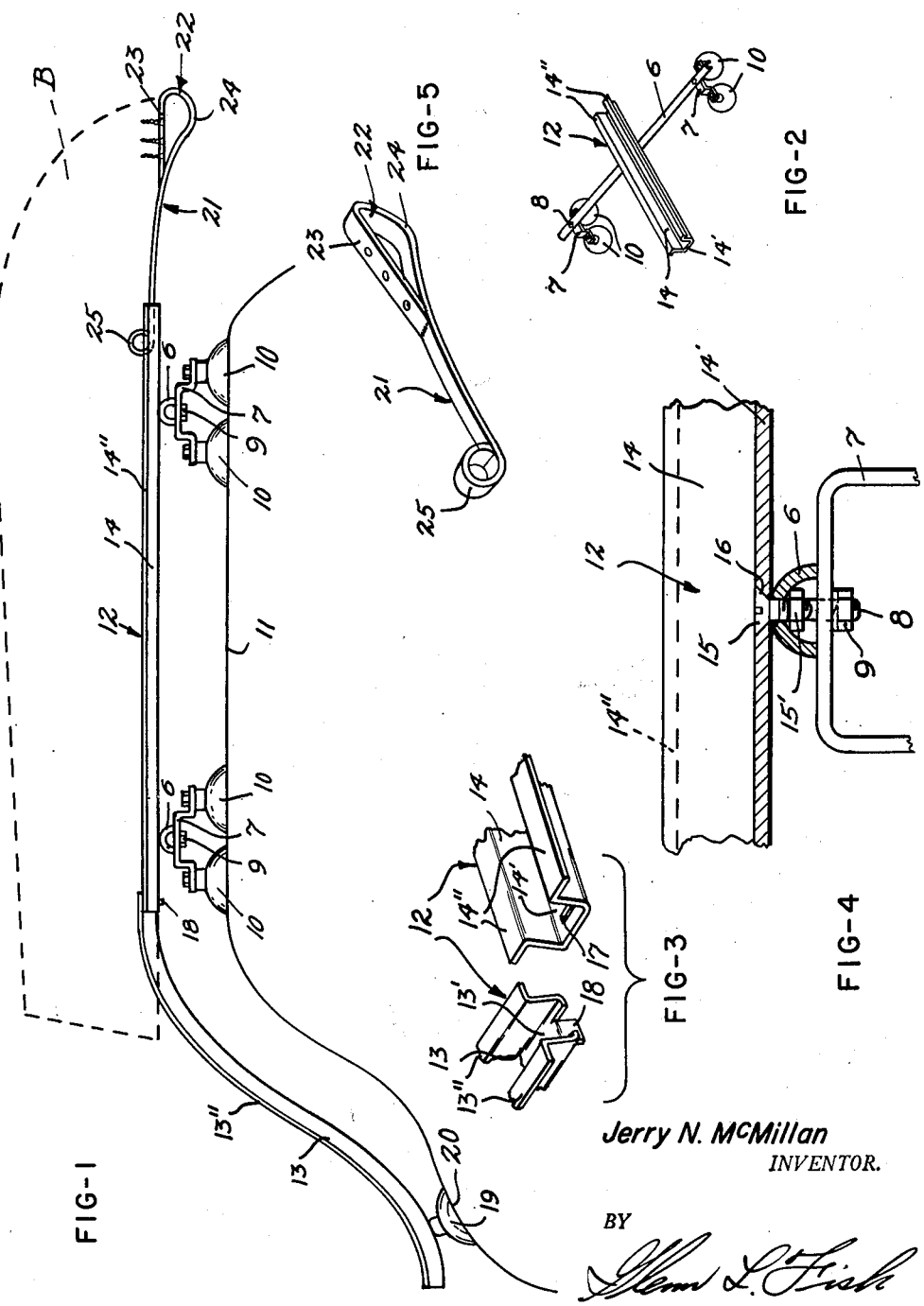
Jerry N. McMillan
INVENTOR.
BY Patented Dec. 22, 1953

2,663,473

UNITED STATES PATENT OFFICE 2,663,473

BOAT LOADING DEVICE

Jerry N. McMillan, Colville, Wash.

Application July 3, 1951, Serial No. 235,055

1 Claim. (Cl. 224—42.1)

My present invention relates to boat loading devices and has particular reference to a device to aid one when loading a boat on to or removing the same from the top of an automobile.

One object of the invention lies in the provision of a device whereby a relatively light weight boat, such as a row boat, may be easily placed upon the top of a motor vehicle by one person without marring the vehicle's exterior finish and also with a minimum amount of effort.

Another object of the invention lies in the provision of a boat loading device which provides guide means for centrally positioning a boat transversely centered upon a motor vehicle to preclude uneven distribution of weight on the vehicle body.

Another object of the invention lies in the provision of a boat loading device comprising a channel mounted longitudinally on the top of a motor vehicle and which has separable sections which include a removable loading ramp section and a supporting guide section.

Another object of the invention lies in the provision of a boat loading device which includes a skid or runner secured to the beak of a boat on the top side and adapted to slide in a channel extending longitudinally on the top of a motor vehicle when the boat is inverted for loading thereon.

Another object of the invention lies in the provision of a boat loading device which is adapted to be removably secured upon a motor vehicle and supported by rubber suction cups to preclude damage to the finish.

Another object of the invention lies in the provision of a boat loading device which is inexpensive to manufacture, uses a minimum amount of material and which is light and strong and yet very effective as a device for loading and unloading boats.

These and other objects will be apparent during the course of the following description.

In the accompanying drawings, forming a part of this specification, and in which like numerals are employed to designate like parts throughout the same, Figure 1 is a side elevation of my improved boat loading device showing it applied to the top and back of an automobile indicated in profile, and a boat mounted thereon by dotted lines, Figure 2 is a fragmentary perspective view of the forward end of the invention, Figure 3 is an exploded perspective view of the means for releasably securing the sections of the device together, Figure 4 is a fragmentary longitudinal cross section through a portion of the channel and its supporting bar, and Figure 5 is a perspective view of the runner adapted to be secured to a boat and for sliding in the channel of the boat loading device.

The usual method of transporting a boat on a motor vehicle necessitates some form of support frame to carry the boat and preclude its rubbing or scratching the finish of the vehicle. A common and relatively inexpensive type consists of transversely extending, longitudinally spaced, cross bars 6 which are supported adjacent each end upon brackets 7 and secured thereto by means of bolts 8 and nuts 9. On the ends of the brackets 7, rubber suction cups 10 are secured and provided to rest upon the top of an automobile as shown in profile by line 11 of Figure 1. Straps (not shown) are provided to secure the bars at their ends to the vehicle and include means, such as clamps, to secure to the rain runoff trough or door frame and suitably mount the carrier frame.

To load a boat upon this type carrier, when two or three men are available, the boat is turned top side down, lifted horizontally and placed upon the cross bars. Straps (not shown) are then passed over the upwardly disposed bottom of the boat and secured at the ends of the respective cross bars thus mounting the boat against shifting movement for transportation upon the vehicle.

This has been found to be a very desirable boat carrying support, but very often, one is alone when it is desired to load or unload the boat, and because of its position above the automobile, it is impossible for one man to lift it horizontally disposed for unloading and likewise because of its large size and weight one cannot lift it from the ground and place it upon the supporting frame while maintaining it in a horizontal position. Attempts at loading a boat by one man upon this type carrier have caused many scratched and dented automobiles, as well as broken boats from dropping.

My invention is very effective in overcoming this difficulty and enables one person to load a boat with very little effort and eliminates the danger of marring an automobile. The improved boat loading device comprises a longitudinally extending channel 12 having a substantial open S-shaped ramp section 13 and a horizontally disposed supporting guide section 14. The guide section 14 is positioned at the transverse center of the automobile top and extends longitudinally thereof.

Transversely extending longitudinally spaced cross bars 6 support the section 14, and secure the section thereto by means of a short bolt 15 which passes downwardly through tapered hole 16 in the bottom 14' of the section and through the cross bar 6 where the section and cross bar meet. Nuts 15' are mounted under the cross bars 6 and secure the parts together. The bolts 15 are countersunk to provide a smooth unobstructed upper surface along the bottom 14' the full length of the section. Outwardly disposed lips 14'' are provided on the section 14 for additional strength and rigidity.

Adjacent the rear end of section 14, I have formed a transversely extending slot 17 in the bottom 14' and this is provided to receive downwardly bent lip 18 formed by cutting a central portion of the bottom 13' of ramp section 13 at its forward end. The ramp is formed of similar channel shaped material as the section 14 and also has outwardly disposed lips 13'' for strength.

To conform to the rear profile of most automobiles, the ramp is formed substantially as an open S, and has a rubber suction cup 19 secured to the bottom 13' adjacent the rear end by a countersunk bolt similar to bolt 15. When lip 18 is engaged in slot 17 and the suction cup 19 is supported on the back of the auto as at 20, the boat loading device is ready for use.

To use my invention, it is necessary that a runner or wheel be applied to the beak of the boat B, and I have found that a runner is more acceptable since it may also be used as a means for securing an anchor or dock rope. My runner 21 is provided with a forward loop 22 having a flat bottom bar 23 and a substantially teardrop-shaped upper bar 24 forming a loop when viewed in side elevation. The upper bar extends rearwardly a distance and terminates at its end with a downwardly positioned eye or ring 25. The runner is of a length to insure the rear end of the bar 24 and the ring 25 being carried in the channel section 14 to prevent the boat B from moving transversely and shifting the runner 22 out of alignment with the section 14.

To unload the boat the means of securing are loosed, and the boat is pulled rearwardly with the runner sliding in sections 14 and 13 and when the runner reaches a point near the rear end of section 13 the rear end of the boat is placed upon the ground and the front end may then be lifted from the loading device. To load the boat, the loop 24 is placed in the rear end of section 13 and the rear of the boat is lifted and pushed forwardly with the runner passing up the ramp and onto the supporting frame. The rear end is lifted to prevent the gunwales from scratching the automobile top during both loading and unloading operations.

Since ramp section 13 is secured at the forward end only by lip 18 being engaged in slot 17 of section 14, and with its rear end supported upon a rubber suction cup, it may be easily removed, and placed in the trunk of the car for storage when not in use. It is therefore easily assembled or disassembled and not in the way when not in use.

The boat loading device is of such light and small construction, that it may be left mounted upon an automobile and need not be removed in seasons when the boat will not be used.

Having thus described my invention, what I claim and desire to secure by Letters Patent is:

A boat loading device for boats of a length wherein the bow extends beyond the forward edge of the vehicle top comprising in combination a longitudinally extending slide supported on the top midway its transverse dimension, a runner adapted to cooperate with said slide and secured to the beak of the boat carried by said vehicle, a rearwardly extending bar forming a part of the runner and movable in said slide, and an eye on the rear end of said bar and forming an arcuate rear end thereon, said bar being of sufficient length to insure a portion of the bar and the eye to remain engaged with said slide when the boat is upon the vehicle in position for transporting.

JERRY N. McMILLAN.

References Cited in the file of this patent

UNITED STATES PATENTS

| Number | Name | Date |
|---|---|---|
| 1,180,253 | Carlson | Apr. 18, 1916 |
| 2,247,128 | Levey | June 24, 1941 |
| 2,395,717 | Bjork | Feb. 26, 1946 |
| 2,412,162 | Lindblom | Dec. 3, 1946 |
| 2,469,987 | Pilsner | May 10, 1949 |
| 2,598,458 | Somers | May 27, 1952 |

FOREIGN PATENTS

| Number | Country | Date |
|---|---|---|
| 864,799 | France | Feb. 3, 1941 |